L. M. COLE.

LABEL.

APPLICATION FILED DEC. 26, 1914.

Reissued Oct. 26, 1915. 14,000.

Witnesses
B. A. Rif.
Marguerite Bates.

Inventor
Louis M. Cole
By Hazard & Mauze
Att'ys

UNITED STATES PATENT OFFICE.

LOUIS M. COLE, OF LOS ANGELES, CALIFORNIA.

LABEL.

14,000. Specification of Reissued Letters Patent. Reissued Oct. 26, 1915.

Original No. 1,054,826, dated March 4, 1913, Serial No. 643,055. Application for reissue filed December 26, 1914. Serial No. 879,221.

*To all whom it may concern:*

Be it known that I, LOUIS M. COLE, a citizen of the United States, residing at Los Angeles, in the county of Los Angeles and State of California, have invented new and useful Improvements in Labels, of which the following is a specification.

This invention relates to improvements in labeling means for receptacles, cans or the like.

It is an object of the invention to provide a label upon a goods inclosing receptacle which is adapted to contain advertising matter properly exposed to view and which is also adapted to have placed thereon information, recipes or other data, which may be exposed to view when desired for use.

It is an object of the invention to provide a receptacle with a movably mounted label having impressions upon both sides thereof for indicating certain data.

Figure 1:
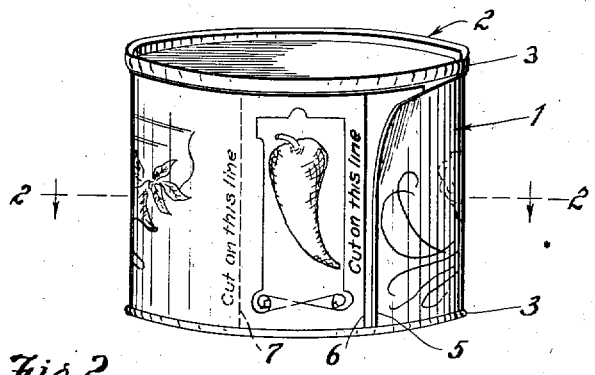
Figure 2:
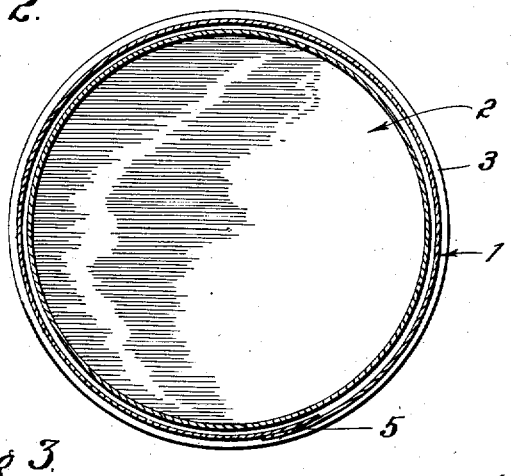
Figure 3:
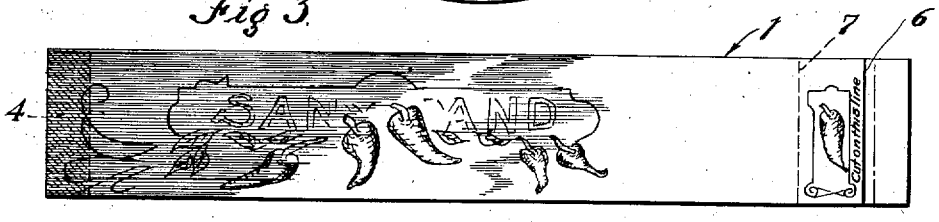
Figure 4:
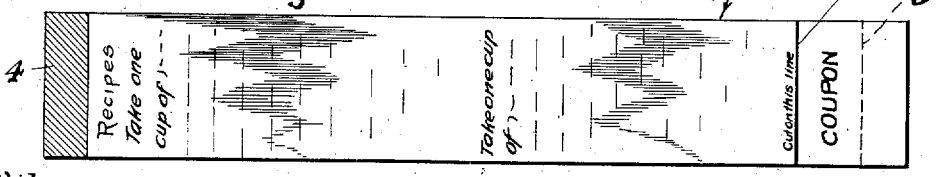

In the accompanying drawing forming a part of this specification, Figure 1 is a perspective view of a can suitable for containing any line of goods, the said can having the improved movable label mounted thereon. Fig. 2 is a transverse sectional view through the can taken upon the line 2—2 of Fig. 1 but showing the can upon an enlarged scale. Fig. 3 is a plan view of the label employed, the same being flattened out as before applying to the can, the outside of the label being shown. Fig. 4 is a similar plan view showing the inside of the label.

The details of the invention will now be more particularly described, reference being had to the drawing in which 1 indicates a label which is usually made of paper and is provided on the outside with any desired configurations, artistic designs or wording to represent the goods which is to be inclosed in the can or receptacle to which the label is applied.

2 indicates a can of ordinary construction having projecting edge flanges 3 at its upper and lower ends for limiting the movement of the label thereon and preventing it from slipping from place. The label is provided with a gummed portion on the inner surface of one end thereof as at 4 which is adapted to lap over the other end thereof when the label is applied to the can so as to be made to adhere thereto for fastening the end of the label together, as indicated at 5 in Fig. 2.

The gummed portion of the label is preferably so arranged that when the ends are fastened together the label will not adhere to the can or receptacle at any point but will be loosely mounted thereon as shown in Fig. 2. The said label is also provided with a line or indicating mark 6 upon its outer surface showing where the label is to be cut for removing it and the words "Cut on this line" may be arranged adjacent thereto. The line for cutting the label is preferably located to one side of the lapped ends so that the cut need only be made through a single thickness of the paper or other material of which the label is composed.

The inner surface of the label is provided with various data and printed matter, which it is desired to convey to the purchaser of the goods, for instance a portion of said label on its inner surface is provided with printed matter indicating that it is a coupon, one or more of which if saved and presented to the company selling the goods will command some kind of a premium. The inner surface of the said label is provided with a line 7 indicating where the same should be cut to sever the coupon therefrom. The remaining portion of the label upon its surface is preferably provided with desirable data such for instance as recipes for preparing the material contained in the can if it be food or for cooking generally or for setting forth any other desirable or useful information.

The label thus forms a desirable addition to the receptacle not only because of its advertising qualities in setting forth the properties of the goods for the merchant or distributer, but also because of the information, coupons or the like which is obtained by removing and preserving the said label.

It will be understood that a label of this character may be applied to various kinds of receptacles, cans or the like in which goods are packed so that said label placed thereon is capable of being removed for the purposes above set forth.

What I claim is:

1. As a new article of manufacture, a label adapted to be detachably fastened around a can, provided on its upper and lower edges with retaining flanges by fastening the ends of the label together, said label having printed display matter on the outer surfaces and a printed coupon and other useful printed matter on the inner surface thereof, said label also being provided with a transversely disposed cutting line thereon out of registry with said printed coupon and other printed matter, whereby when the label is cut on said line it can be removed from the can so that the printed matter can be read on the concealed side of the label and the coupon detached therefrom in an unmutilated condition.

2. As a new article of manufacture, a label adapted to be detachably secured around a container, said label for said container having display matter relating to the contents of the container on its outer face, the inner face of said label bearing useful printed matter, said label being provided on its outer face with a line disposed transversely thereto and out of registry with said useful printed matter indicating where said label should be severed to remove the entire label from the container without mutilating the matter on its inner side.

3. As a new article of manufacture, a label adapted to be detachably secured around a package, said label having display matter relating to the contents of the package on its outer face, the inner face of said label bearing useful printed matter, said label being provided on the outer face thereof with a line out of registry with said useful printed matter indicating where the label may be severed to remove the entire label without mutilating the printed matter on its inner face.

In witness that I claim the foregoing, I have hereunto subscribed my name this 19th day of December, 1914.

LOUIS M. COLE.

Witnesses:
R. S. BERRY,
MARGUERITE BATES.